(12) United States Patent
Lehr

(10) Patent No.: US 6,365,719 B1
(45) Date of Patent: Apr. 2, 2002

(54) BRIDGED DISAZO COMPOUNDS

(75) Inventor: Friedrich Lehr, Efringen Kirchen (DE)

(73) Assignee: Clariant Finance (BVI) Limited, Tortola (VI)

(*) Notice: Subject to any disclaimer, the term of this patent is extended or adjusted under 35 U.S.C. 154(b) by 0 days.

(21) Appl. No.: 09/509,575

(22) PCT Filed: Sep. 22, 1998

(86) PCT No.: PCT/IB98/01463

§ 371 Date: Mar. 27, 2000

§ 102(e) Date: Mar. 27, 2000

(87) PCT Pub. No.: WO99/16833

PCT Pub. Date: Apr. 8, 1999

(30) Foreign Application Priority Data

Sep. 22, 1997 (GB) ................................. 9720507
Sep. 22, 1997 (GB) ................................. 9720508
Dec. 5, 1997 (GB) ................................. 9725758

(51) Int. Cl.$^7$ .................. C09B 33/10; C09B 43/16; C09B 45/28; C09B 67/22; C09D 11/02
(52) U.S. Cl. .................. 534/691; 534/689; 534/797; 106/31.48; 8/681; 8/918; 8/919
(58) Field of Search ................ 534/689, 691, 534/797; 106/31.48; 8/681, 918, 919

(56) References Cited

FOREIGN PATENT DOCUMENTS

| EP | 325041 | * | 7/1989 |
| GB | 2308380 | * | 6/1997 |
| JP | 07-090212 | * | 4/1995 |

OTHER PUBLICATIONS

Szadowski et al., Chemical Abstracts, 124:234837, 1996.*
Croft et al., Chemical Abstracts, 119:119477, 1993.*

* cited by examiner

*Primary Examiner*—Fiona T. Powers
(74) *Attorney, Agent, or Firm*—Scott E. Hanf

(57) ABSTRACT

Compounds of formula (I)

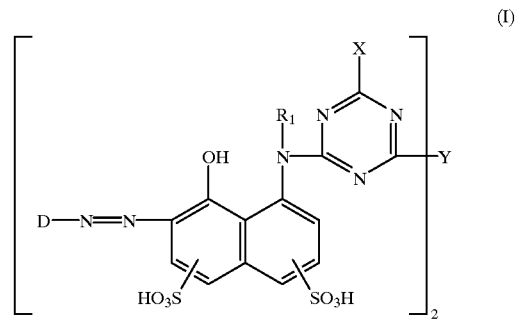

with the meanings of D, $R_1$, $R_2$, X and Y as given in claim 1 can be used as paper dyes or direct dyes or for the preparation of ink-jet inks.

13 Claims, No Drawings

BRIDGED DISAZO COMPOUNDS

BACKGROUND OF THE INVENTION

The invention relates to monoazo compounds containing sulphonic acid groups, salts thereof and mixtures of these compounds. They are suitable for use as dyestuffs.

DESCRIPTION OF THE PREFERRED EMBODIMENTS

According to the invention there are provided compounds of formula (I):

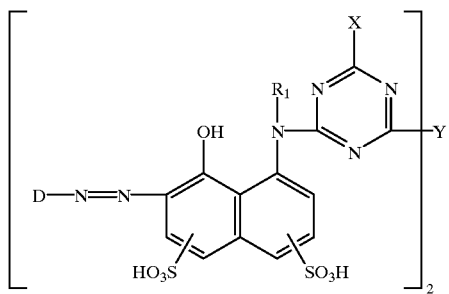

(I)

wherein

D is the rest of a diazo component selected from the group having the formulae (a), (b), (c)

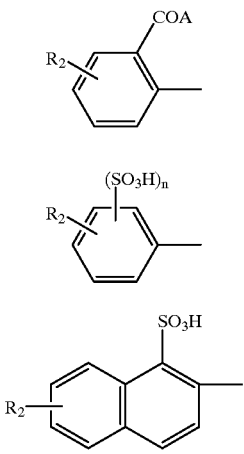

(a)

(b)

(c)

A is OH or $NH_2$;

$R_1$ is independently H, $C_{1-4}$alkyl;

$R_2$ is hydrogen, $C_{1-4}$alkyl, $C_{1-4}$alkoxy, halogen;

X is an aliphatic, cycloaliphatic, aromatic or heterocyclic amino group;

Y is a divalent bridge;

m is 0, 1 or 2; and n is 1 or 2;

and salts thereof as well as mixtures of such compounds.

Preferred compounds of formula (I) have the formulae (Ia), (Ib) or (Ic):

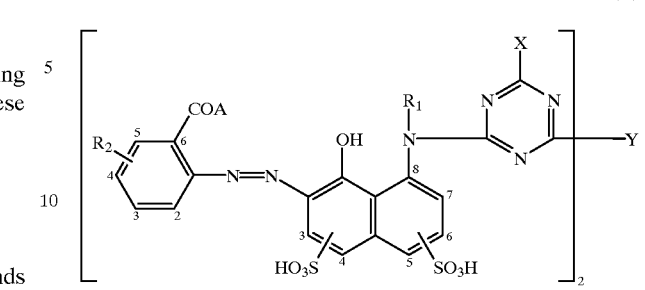

(Ia)

wherein $R_1$, $R_2$, X, Y and A have the meaning given above; in metal-free or copper complex form, and salts thereof and mixtures of such compounds or complexes. Preferably the compounds of formula (Ia) above, are in metal-free form.

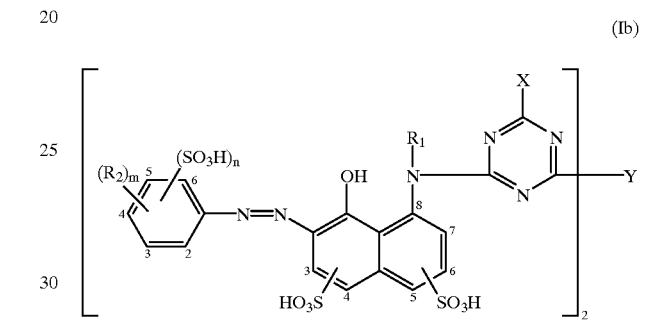

(Ib)

wherein $R_1$, $R_2$, m, n, X and Y have the meaning given above;

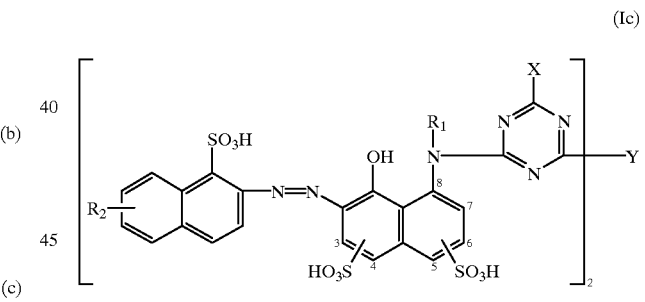

(Ic)

wherein $R_1$, $R_2$, X and Y have the meaning given above; salts thereof and mixtures of such compounds.

Preferably the sulphonic acid groups on the naphtholrest are attached at the 3- and 6-positions of the naphthol radical.

Any alkyl or alkylene present is linear or branched unless indicated to the contrary. In any hydroxy- or alkoxy-substituted alkyl or alkylene group which is linked to a nitrogen atom, the hydroxy or alkoxy group is bound to a carbon atom other than to the $C_1$-atom. In any alkylene group substituted by two hydroxy groups, the hydroxy groups are bound to different carbon atoms.

Halogen atoms are preferably chlorine.

X is preferably amino, mono- or di-$C_{1-3}$alkylamino, mono- or di(hydroxy-$C_{2-4}$alkyl)amino, monocarboxy-$C_{1-4}$alkylamino, monosulpho-$C_{1-4}$alkylamino, optionally substituted phenylamino, phenylalkylamino, morpholino or piperazino (substituted by alkyl or hydroxyalkyl).

Y is a divalent bridge linking two parts of the molecule via nitrogen atoms attached to the triazine ring and preferably is the rest of phenylene diamine, piperazine or 4,4'-diaminostilbene-2,2'-disulfonic acid.

Any alkyl as $R_1$ preferably contains 1 or 2 carbon atoms, and is more preferably methyl. Any substituted alkyl is preferably linear or branched $C_{2-3}$alkyl, and is preferably monosubstituted by hydroxy.

$R_2$ is preferably hydrogen or $C_{1-4}$alkyl, most preferably methyl.

The present invention further provides a process for the preparation of compounds of formula (I) comprising reacting the dyestuff of formula (IIa) having the following formula:

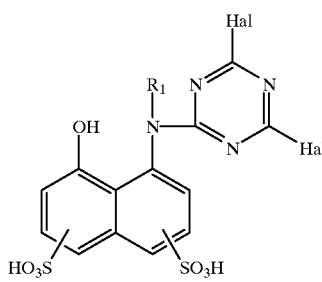

(IIa)

in which $R_1$ is as above defined and Hal is halogen, with a diazotised compound of formula (IIb), having the following formula:

D—NH$_2$ (IIb)

so as to give a compound of formula (III), having the following formula:

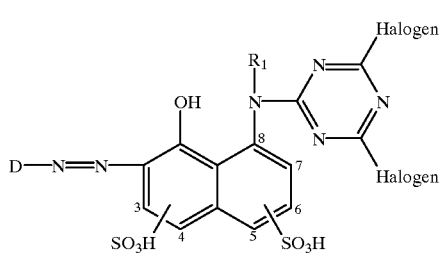

(III)

in which D and $R_1$ are as above defined, which compound is reacted with an appropriate diamino compound to give a compound of formula (I) in which X is halogen.

Finally, such compound is further reacted with an appropriate amino compound to give a compound of formula (I) in which X is an amino group. If mixtures are intended, the starting compounds are reacted as mixtures or the final compounds are mixed.

An alternative process for the preparation of compounds of formula (I), in which D is of formula (a) with A=OH and/or formula (c), comprises reacting the dyestuff of formula (IV) having the following formula:

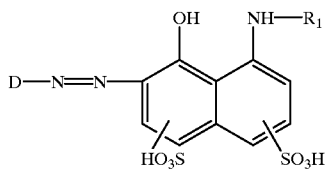

(IV)

in which D and $R_1$ are as above defined and preferably the substituents being so positioned as above defined, with cyanuric halogenide so as to give a compound of formula (III), having the following formula:

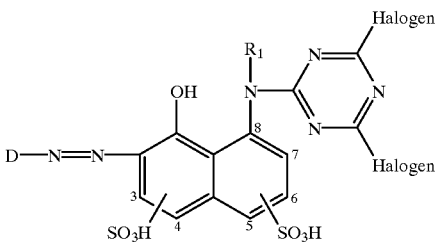

(III)

in which D and $R_1$ are as above defined, which compound is reacted with an appropriate diamino compound to give a compound of formula (I) in which X is halogen. Finally, such compound is further reacted with an appropriate amino compound to give a compound of formula (I) in which X is an amino group.

A metal-free compound of formula (I) in which D is of the formula (a) with COOH may be converted into a 1:1 copper complex in accordance with known methods. This coppering may be carried out by reacting an appropriate metal-free compound of formula (I) with a copper-donating compound which is employed in such an amount so as to provide at least one equivalent of copper per equivalent of monoazo compound to be metallised.

Suitably, the 1:1 copper complexes may be prepared at 10° C. to 50° C. and at pH 4 to 7 in the presence of copper(II) salts.

The compounds of formula (I) thus obtained may be isolated in accordance with known methods.

The type of cations assigned to the sulpho groups in a compound of formula (I) may be influenced in various ways in accordance with the process; these are known methods throughout. In particular, mixed salts may be obtained by well-directed control of the process employed.

The compounds according to the invention in the form of their water-soluble salts are used for dyeing or printing organic substrates containing hydroxy groups, thiol groups or nitrogen, in particular as paper dyes or direct dyes.

As a result of their high substantivity, the compounds according to the invention are very suitable as direct dyes. The usual technical application processes are employed as dyeing and printing processes. Natural and regenerated cellulose, e.g. cotton, are preferably dyed by a conventional exhaust process at dyeing temperatures of 50–100° C.

The dyestuffs according to the invention are notable for their depth of color, and produce good exhaust. The dyeings obtained (especially on cotton and paper) are of pure shade.

On the said substrates, the dyeings generally have very good wet fastnesses and good light fastness. The very good water and perspiration fastness and good fastness to peroxide, perborate and chlorine may also be mentioned.

The wet fastness of the direct dyeings on cellulosic textile materials may be decisively improved by means of a special after-treatment with selected assistants. In particular, the washing fastness is improved such that its quality level does not undergo any reduction even after repeated washes at 60° C.

A suitable assistant for this after-treatment may be a fixing agent in the form of a pre-condensate or mixture, which is obtained either A) from the product of reacting the mono- or polyfunctional primary or secondary amine with cyanamide, dicyandiamide, guanidine or biguanide; or of ammonia with cyanamide or dicyandiamide, whereby the product contains reactive hydrogen atoms bonded to nitrogen, or B) from a quaternary polyalkylene-polyamine with C) a N-methylol compound of a urea, melamine, guanamine, triazinone, urone, carbamate or acid diamide, optionally in the presence of D) a catalyst for cross-linking with a N-methylol compound of type C.

Details relating to the assistant in the form of the combination A/C/D are described in detail in PCT application publication no. WO 81/02 423; details on the combination B/C/D may be found in German Published Specification DOS 31 37 404.

Printing is effected by means of impregnation with a printing paste which is prepared by a known method.

The new dyestuffs may also be used for dyeing or printing leather, preferably chrome-tanned types of leather, using methods known per se. In addition, the dyestuffs may be used to produce inks by a method known per se.

Most preferably, the dyestuffs are used for dyeing or printing of paper e.g., sized or unsized, wood-free or wood-containing paper or paper-based products such as cardboard. They may be used in continuous dyeing in the stock, dyeing in the size press, in a conventional dipping or surface coloring process. The dyeing and printing of paper is effected by known methods.

The dyeings and prints and particularly those obtained on paper, show good fastness properties.

The compounds of formula (I) may be converted into dyeing preparations. Processing into stable liquid, preferably aqueous, or solid (granulated or powder form) dyeing preparations may take place in a generally known manner. Advantageously suitable liquid dyeing preparations may be made by dissolving the dyestuff in suitable solvents such as mineral acids or organic acids, e.g., hydrochloric acid, sulphuric acid, phosphoric acid, formic acid, acetic acid, lactic acid, glycolic acid, citric acid and methanesulphonic acid. Furthermore formamnide, dimethylformamide, urea, glycols and ethers thereof, dextrin or addition products of boric acid with sorbite may be used together with water, optionally adding an assistant, e.g. a stabilizer. Such preparations may be obtained, for example, as described in French patent specification No. 1,572,030.

The compounds of formula (I) (in the corresponding salt form) have good solubility especially in cold water. Owing to their high substantivity the compounds of the present invention exhaust practically quantitatively and show a good build-up power. They can be added to the stock directly, i.e. without previously dissolving, as either a dry powder or granulate, without reducing the brilliance or the yield of color. They can also be used in soft water without loss of yield. They do not mottle when applied on paper, are not inclined to give two-sided dyeing on paper and are practically insensitive to filler or pH variations. They operate over a broad pH range, in the range of from pH 3 to 10. When producing sized or unsized paper, the waste water is essentially colorless. This feature, which is extremely important from an environmental view-point, when compared with similar known dyes, shows a marked improvement. A sized paper dyeing when compared with the corresponding unsized paper dyeing does not show any decrease in strength.

The paper dyeings or printings made with the compounds, in particular the metal-free forms, according to the invention are clear and brilliant and have good light fastness: On exposure to light for a long time, the shade of the dyeing fades tone in tone. They show very good wet fastness properties; being fast to water, milk, fruit juice, sweetened mineral water, tonic water, soap and sodium chloride solution, urine etc. Furthermore, they have good alcohol fastness properties. The wet fastness properties are improved compared to known dyes showing otherwise similar properties. They do not exhibit a tendency towards two-sidedness.

Paper dyed or printed with the compounds of the present invention can be bleached either oxidatively or reductively, a feature which is important for the recycling of waste and old paper/paper products. It has surprisingly been found that the dyes of the present invention demonstrate excellent bleachability, particularly when bleaching is carried out reductively. This property, together with the improved backwater results and wet-fastnesses, shows a marked improvement over known dyes having otherwise similar properties.

The compounds of the present invention may also be used to dye paper containing wood-pulp where even dyeings, having good fastness properties are obtained. Furthermore, they may be used for the production of coated paper in accordance with known methods. Preferably when coating, a suitable filler, for example kaolin, is employed in order to give a one-side coated paper.

The compounds of the present invention are also suitable for dyeing in combination with other dyes for example other cationic or anionic dyes. The compatibility of the compounds of the present invention when used as a dye in mixtures with other commercially available dyes, may be determined according to conventional methods. The thus obtained dyeings have good fastness properties.

The invention further provides a substrate which has been dyed or printed with a compound of the present invention. The substrate may be selected from any of the above mentioned substrates. A preferred substrate is a substrate comprising cellulose such as cotton or paper or paper based product.

The invention further provides a preferred process of dyeing paper comprising the continuous introduction into a stock solution which is being constantly agitated, of a dye of the present invention.

The invention yet further provides the use of a compound of the present invention for dyeing or printing any of the abovementioned substrates.

The following Examples further serve to illustrate the invention. In the Examples all parts and all percentages are by weight and the temperatures given are in degrees Celsius, unless indicated to the contrary. Parts of weight relate to parts by volume as g to ml.

EXAMPLES

Example 1

In a beaker glass of 3 liters equipped with stirrer, pH-electrode and thermometer a mixture of 165 parts water, 165 parts ice and 38 parts of 2,4,6-trichloro-1,3,5-triazine with 3 drops of a wetting agent (e.g. Sandozin NIL) is stirred for about 30 minutes at 0–5° C. to obtain a fine suspension. A solution of 63.8 parts of 1-amino-8-hydroxynaphthalene-3,6-disulfonic acid in 200 parts of water which is adjusted to pH=7 by addition of a 30% solution of sodium hydroxide is then added at 0–5° C. in the course of 30 minutes. After stirring for an additional hour at 2–5° C. a solution with a pH value of about 0.7 is obtained.

A diazonium salt suspension, prepared from 32.2 parts of 1-amino-4-methyl-benzene-6-sulfonic acid, 600 parts of water, 95 parts of ice, 23.6 parts of a 30% solution of hydrochloric acid and 50 parts of a 4 N solution of sodium nitrite, is added. In the course of 60 minutes, the pH value is raised to pH=7 by addition of about 150 parts of a 15% solution of sodium carbonate. Stirring is continued for 2 additional hours at 10° C. and pH=7.

In the course of 20 minutes a solution of 37.0 parts of 4,4'-diamino-stilbene-2,2'-disulfonic acid in 400 parts of water which is adjusted to pH=7 by addition of a 30% solution of sodium hydroxide is then added whereby the pH-value is kept at 7–7.5 by addition of a 15% solution of sodium carbonate. The reaction mixture is warmed to 40° C. and stirred for an additional hour at 40° C. whereby pH=8 is adjusted by addition of a 15% solution of sodium carbonate.

The reaction mixture is then transfered into a reaction vessel of 4.5 liters equipped with stirrer, pH electrode, thermometer and reflux condenser. 23.4 parts of diethanolamine are added and the mixture is heated to 95° C. The pH-value first raises to about 9.4 and drops during the reaction. It is kept at 8.5 by addition of a 30% solution of sodium hydroxide. After about 4 hours the reaction is completed. The reaction mixture is then cooled to 25° C. and adjusted to pH=6 by addition of about 8 parts of a 30% solution of hydrochloric acid. In the course of 1 hour 25% (weight per volume) of sodium chloride are added in portions. After stirring over night and cooling to room temperature the precipitated dyestuff is filtered and dried in vacuum at 80° C. 472 parts of dyestuff with the structure:

The dyestuff also has high affinity to cotton (expressed as exhaustion value when dyeing as a direct dyestuff and the bluish red dyeings have good wet and light fastnesses.

Example 2

In a beaker glass of 3 liters equipped with stirrer, pH-electrode and thermometer a mixture of 193 parts water, 61 parts ice and 94.1 parts of 2,4,6-trichloro-1,3,5-triazine with 3 drops of a wetting agent (e.g. Sandozin NIL) is stirred for about 30 minutes at 0–5° C. to obtain a fine suspension. A solution of 159.5 parts of 1-amino-8-hydroxynaphthalene-3,6-disulfonic acid in 310 parts of water which is adjusted to pH=7 by addition of a 30% solution of sodium hydroxide and which is cooled to 10° C. by the addition of 85 g ice, is then added in the course of 30 minutes. Additional 88 g ice are added and the reaction mixture is stirred over night.

In a beaker glass of 5 liters a diazonium salt suspension is prepared from 95.4 parts of 1-amino-4-methyl-benzene-6-sulfonic acid, 800 parts of water, 533 parts of ice, 81 parts of a 30% solution of hydrochloric acid and 128.8 parts of a 4 N solution of sodium nitrite. The above prepared reaction mixture is added and in the course of 120 minutes, the pH value is raised to pH=6.2 by addition of about 415 parts of a 15% solution of sodium carbonate. Stirring is continued for 60 additional minutes at 10° C. and pH=6.2, 60 minutes at 10° C. and pH=7.2 and 60 minutes at 25° C. and pH=7.2.

79.6 parts of 4,4'-diamino-stilbene-2,2'-disulfonic acid are added. The reaction mixture is stirred over night whereby the pH-value is kept at 7.2 by addition of a 30% solution of sodium hydroxide. The reaction mixture is warmed to 40° C. In the course of 1 hour 8% (weight per volume) of sodium chloride are added in portions and the precipitated dyestuff is filtered.

In a reaction vessel of 2.5 liters equipped with stirrer, pH-electrode, thermometer and reflux condenser the obtained dyestuff is suspended in 1380 ml water. 48.1 parts of diethanolamine are added and the mixture is heated to 95° C. The pH-value first raises to about 10.6 and drops during the reaction. It is kept at 8.5 by addition of a 30% solution of sodium hydroxide. After about 4 hours the reaction is

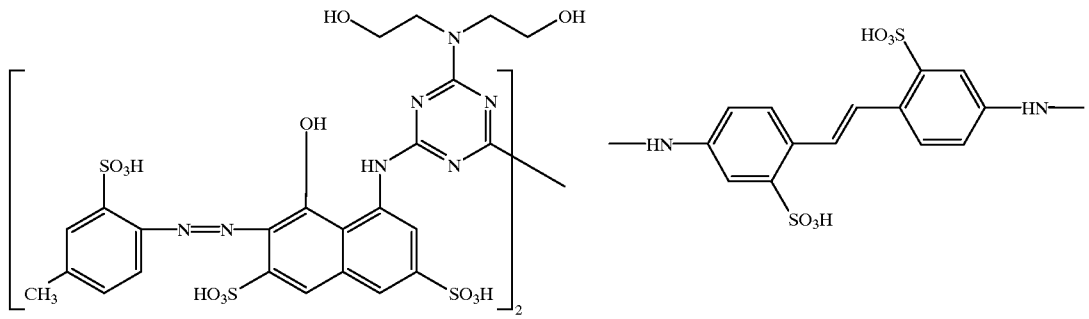

are obtained in the form of the sodium salt. It dyes sized and unsized paper in bluish red hues (magenta, λmax=528 nm). Due to its high affinity for the substrate the backwater is almost colorless and the dyeings have remarkably high fastness to water, alcohol, milk and acetic acid.

completed. In the course of 1 hour 25% (weight per volume) of sodium chloride are added in portions. After stirring 2 hours at 80° C. the precipitated dyestuff is filtered and dried in vacuum at 80° C. 538.8 parts of dyestuff with the structure:

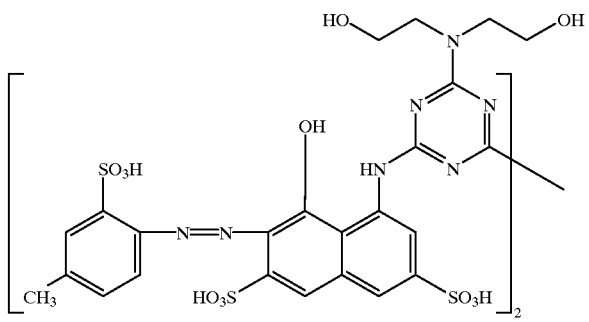
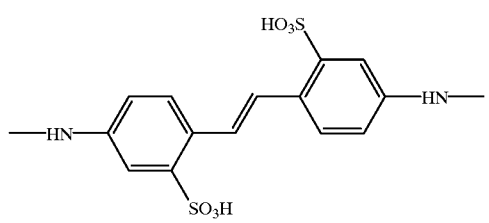

are obtained in the form of the sodium salt. It dyes sized and unsized paper in bluish red hues (magenta, λmax=528 nm). Due to its high affinity for the substrate the backwater is almost colorless and the dyeings have remarkably high fastness to water, alcohol, milk and acetic acid.

The dyestuff also has high affinity to cotton (expressed as exhaustion value when dyeing as a direct dyestuff) and the bluish red dyeings have good wet and light fastnesses.

Example 3

173.2 parts 2,4,6-trichloro-1,3,5-triazine;
293.5 parts 1-amino-8-hydroxynaphthalene-3,6-di-sulfonic acid;
172.0 parts 1-amino-4-methyl-benzene-6-sulfonic acid;
148.1 parts 4,4'-diamino-stilbene-2,2'-disulfonic acid; and
105.1 parts diethanolamine
are reacted analogously as described in example 2. The reaction mixture of 95° C. is cooled to 50° C. and 70 parts of Hyflo-Supercel (filtration auxiliary) are added. After stirring for 10 minutes at 50° C. the reaction mixture is filtrated. The 5908 parts process solution are ultrafiltrated at 40–50° C. by using a G20 membrane and concentrated up to 2423 parts solution.

The obtained liquid dyestuff formulation contains only traces of remaining inorganic salts and exhibits perfect storage stability.

Examples 4–116

Further dyestuffs of the general formula (I) may be produced analogously to the procedure given in Example 2 (see Tables). In all Examples $R_1$=H and the two sulpho-groups at the aminonaphthol radical are in the positions 3 and 6.

In Table 1 the diazo component is of the formula

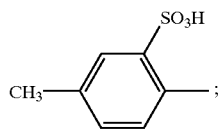

in Table 2 the diazo component is of the formula

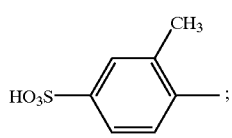

in Table 3 the diazo component is of the formula

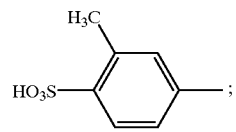

in Table 4 the diazo component is of the formula

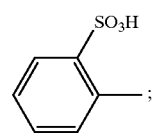

in Table 5 the diazo component is of the formula

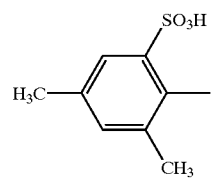

in Table 6 the diazo component is of the formula

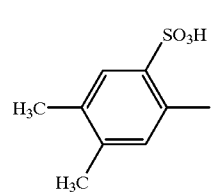

in Table 7 the diazo component is of the formula

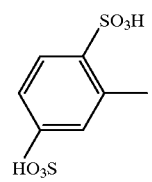

TABLE 1
| Ex. | X | Y | λmax* (nm) |
|---|---|---|---|
| 4 | —NH—C₂H₄—OH | 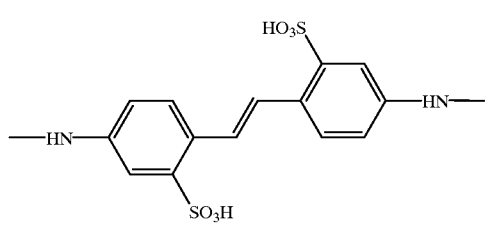 | 527 |
| 5 | 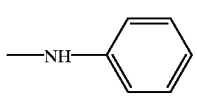 | do | 547 |
| 6 | 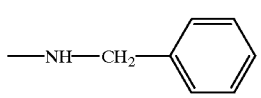 | do | 546 |
| 7 | 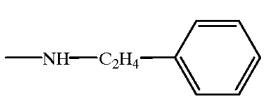 | do | 547 |
| 8 | 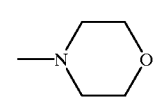 | do | 526 |
| 9 | —NH—C₂H₄—OH | 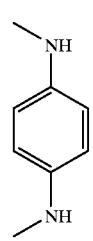 | 517 |
| 10 | 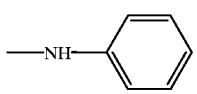 | do | 523 |
| 11 | 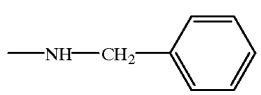 | do | 521 |
| 12 | 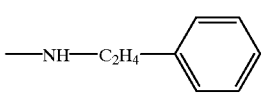 | do | 523 |
| 13 | 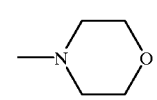 | do | 518 |
| 14 | —N(—C₂H₄—OH)₂ | do | 517 |

TABLE 1-continued
| Ex. | X | Y | λmax* (nm) |
|---|---|---|---|
| 15 | —NH—C₂H₄—OH | 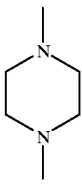 | 547 |
| 16 | | do | 526 |
| 17 | | do | 527 |
| 18 | | do | 528 |
| 19 | | do | 545 |
| 20 | —N(—C₂H₄—OH)₂ | do | 546 |
*solvent: Water/ammonium actate
TABLE 2
| Ex. | X | Y | λmax* (nm) |
|---|---|---|---|
| 21 | —NH—C₂H₄—OH | 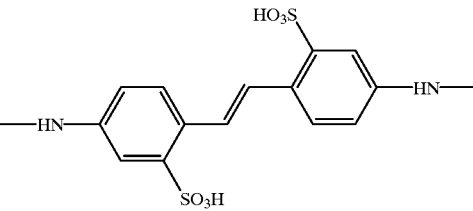 | 563 |
| 22 | | do | 531 |
| 23 | | do | 533 |
| 24 | | do | 532 |
| 25 | | do | 562 |

TABLE 2-continued

| Ex. | X | Y | λmax* (nm) |
|---|---|---|---|
| 26 | —N(—C$_2$H$_4$—OH)$_2$ | do | 561 |
| 27 | —NH—C$_2$H$_4$—OH | 4-(methylamino)phenyl-NH— (1,4-phenylenediamine linker) | 519 |
| 28 | —NH—C$_6$H$_5$ (anilino) | do | 528 |
| 29 | —NH—CH$_2$—C$_6$H$_5$ | do | 527 |
| 30 | —NH—C$_2$H$_4$—C$_6$H$_5$ | do | 526 |
| 31 | morpholino | do | 520 |
| 32 | —N(—C$_2$H$_4$—OH)$_2$ | do | 521 |
| 33 | —NH—C$_2$H$_4$—OH | 1,4-piperazinediyl (N,N′-dimethylpiperazine linker) | 550 |
| 34 | —NH—C$_6$H$_5$ (anilino) | do | 530 |
| 35 | —NH—CH$_2$—C$_6$H$_5$ | do | 532 |
| 36 | —NH—C$_2$H$_4$—C$_6$H$_5$ | do | 531 |
| 37 | morpholino | do | 549 |
| 38 | —N(—C$_2$H$_4$—OH)$_2$ | do | 548 |

*solvent: Water/ammonium acetate

TABLE 3

| Ex. | X | Y | λmax* (nm) |
|---|---|---|---|
| 39 | —NH—C$_2$H$_4$—OH | HO$_3$S and SO$_3$H substituted stilbene with two —HN— groups | 551 |
| 40 | —NH—C$_6$H$_5$ (phenyl) | do | 549 |
| 41 | —NH—CH$_2$—C$_6$H$_5$ | do | 548 |
| 42 | —NH—C$_2$H$_4$—C$_6$H$_5$ | do | 547 |
| 43 | morpholino (—N(C$_2$H$_4$)$_2$O) | do | 551 |
| 44 | —N(—C$_2$H$_4$—OH)$_2$ | do | 550 |
| 45 | —NH—C$_2$H$_4$—OH | 1,4-phenylene with two —NH— groups | 515 |
| 46 | —NH—C$_6$H$_5$ | do | 523 |
| 47 | —NH—CH$_2$—C$_6$H$_5$ | do | 521 |
| 48 | —NH—C$_2$H$_4$—C$_6$H$_5$ | do | 522 |
| 49 | morpholino | do | 517 |
| 50 | —N(—C$_2$H$_4$—OH)$_2$ | do | 516 |

TABLE 3-continued
| Ex. | X | Y | λmax* (nm) |
|---|---|---|---|
| 51 | —NH—C₂H₄—OH | piperazine | 542 |
| 52 | —NH—C₆H₅ | do | 545 |
| 53 | —NH—CH₂—C₆H₅ | do | 544 |
| 54 | —NH—C₂H₄—C₆H₅ | do | 543 |
| 55 | morpholino | do | 541 |
| 56 | —N(—C₂H₄—OH)₂ | do | 542 |
*solvent: Water/ammonium acetate
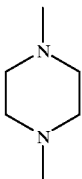
TABLE 4
| Ex. | X | Y | λmax* (nm) |
|---|---|---|---|
| 57 | —NH—C₂H₄—OH | stilbene-disulfonic acid diamine | 529 |
| 58 | —NH—C₆H₅ | do | 539 |
| 59 | —NH—CH₂—C₆H₅ | do | 537 |
| 60 | —NH—C₂H₄—C₆H₅ | do | 538 |
| 61 | morpholino | do | 530 |
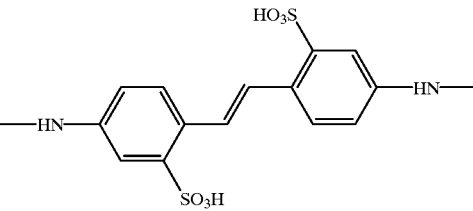

TABLE 4-continued
| Ex. | X | Y | λmax* (nm) |
|---|---|---|---|
| 62 | —N(—C₂H₄OH)₂ | do | 531 |
| 63 | —NH—C₂H₄—OH | 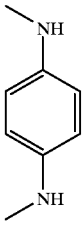 | 516 |
| 64 | 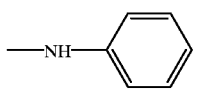 | do | 521 |
| 65 | 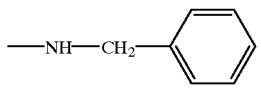 | do | 520 |
| 66 | 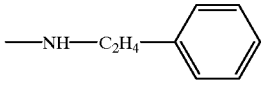 | do | 519 |
| 67 | 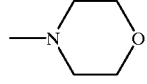 | do | 517 |
| 68 | —N(—C₂H₄—OH)₂ | do | 518 |
| 69 | —NH—C₂H₄—OH | 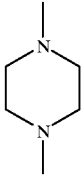 | 536 |
| 70 | 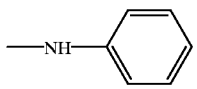 | do | 521 |
| 71 | 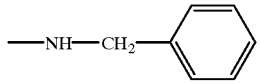 | do | 523 |
| 72 | 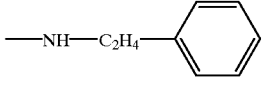 | do | 522 |
| 73 | 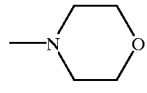 | do | 534 |
| 74 | —N(—C₂H₄—OH)₂ | do | 535 |

TABLE 5
| Ex. | X | Y | λmax* (nm) |
|---|---|---|---|
| 75 | —NH—C₂H₄—OH | 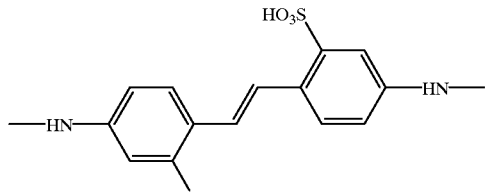 | 526 |
| 76 | 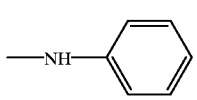 | do | 546 |
| 77 | 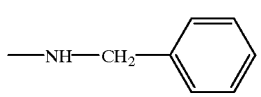 | do | 545 |
| 78 | 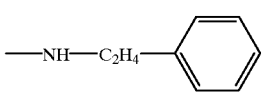 | do | 547 |
| 79 | 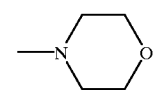 | do | 527 |
| 80 | —N(—C₂H₄—OH)₂ | do | 528 |
| 81 | —NH—C₂H₄—OH | 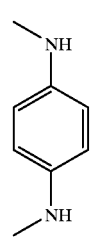 | 518 |
| 82 | 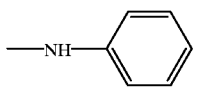 | do | 522 |
| 83 | 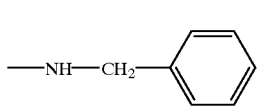 | do | 523 |
| 84 | 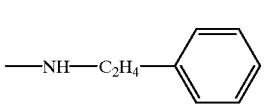 | do | 524 |
| 85 | 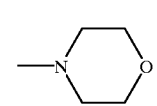 | do | 519 |
| 86 | —N(—C₂H₄—OH)₂ | do | 518 |

TABLE 5-continued
| Ex. | X | Y | λmax* (nm) |
|---|---|---|---|
| 87 | —NH—C₂H₄—OH | piperazine (N-linked, N'-methyl) | 546 |
| 88 | —NH—C₆H₅ | do | 525 |
| 89 | —NH—CH₂—C₆H₅ | do | 528 |
| 90 | —NH—C₂H₄—C₆H₅ | do | 529 |
| 91 | —N(morpholino) | do | 544 |
| 92 | —N(—C₂H₄—OH)₂ | do | 545 |
*solvent: Water/ammonium acetate
TABLE 6
| Ex. | X | Y | λmax* (nm) |
|---|---|---|---|
| 93 | —NH—C₂H₄—OH | 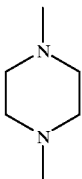 stilbene-2,2'-disulfonic acid bridge with two —HN— linkages | 550 |
| 94 | —NH—C₆H₅ | do | 535 |
| 95 | —NH—CH₂—C₆H₅ | do | 538 |
| 96 | —NH—C₂H₄—C₆H₅ | do | 537 |
| 97 | —N(morpholino) | do | 560 |

TABLE 6-continued

| Ex. | X | Y | λmax* (nm) |
|---|---|---|---|
| 98 | —N(—C₂H₄—OH)₂ | do | 561 |
| 99 | —NH—C₂H₄—OH | *p-phenylenediamine bis-NH* | 530 |
| 100 | —NH—C₆H₅ | do | 535 |
| 101 | —NH—CH₂—C₆H₅ | do | 534 |
| 102 | —NH—C₂H₄—C₆H₅ | do | 533 |
| 103 | —N(morpholine) | do | 525 |
| 104 | —N(—C₂H₄—OH)₂ | do | 526 |
| 105 | —NH—C₂H₄—OH | *N,N'-dimethylpiperazine* | 551 |
| 106 | —NH—C₆H₅ | do | 535 |
| 107 | —NH—CH₂—C₆H₅ | do | 538 |
| 108 | —NH—C₂H₄—C₆H₅ | do | 537 |
| 109 | —N(morpholine) | do | 533 |
| 110 | —N(—C₂H₄—OH)₂ | do | 552 |

*solvent: Water/ammonium acetate

TABLE 7

| Ex. | X | Y | λmax* (nm) |
|---|---|---|---|
| 111 | —NH—C₆H₅ | stilbene with HO₃S, SO₃H, two HN— | 539 |
| 112 | —NH—CH₂—C₆H₅ | do | 538 |
| 113 | —NH—C₂H₄—C₆H₅ | do | 537 |
| 114 | —NH—C₆H₅ | phenylene with two NH groups | 520 |
| 115 | —NH—CH₂—C₆H₅ | do | 519 |
| 116 | —NH—C₂H₄—C₆H₅ | do | 521 |

*solvent: Water/ammonium acetate

Example 117

In a beaker glass of 3 liters equipped with stirrer, pH-electrode and thermometer a mixture of 120 parts water, 120 parts ice and 15.2 parts of 2,4,6-trichloro-1,3,5-triazine with 3 drops of a wetting agent (e.g. Sandozin NIL) is stirred for about 30 minutes at 0–5° C. to obtain a fine suspension. A solution of 68 parts (Titer=55%) of 1-amino-8-hydroxy-7-(2'-carboxy-phenylazo) naphthalene-3,6-disulfonic acid in 1670 parts of water are added dropwise at 10° C. in the course of 1 hour and the pH-value is kept at 5 by addition of a 15% solution of sodium carbonate. The pH-value is then raised to 6–6.63 and the mixture stirred for about 2 hours at 8–10° C. until the reaction is finished. A solution of 14.8 parts of 4,4'-diamino-stilbene-2,2'-disulfonic acid in 160 parts of water which is adjusted to pH=7 by addition of a 30% solution of sodium hydroxide is then added. The reaction mixture is warmed up to 40° C. and stirred for about 2 hours at this temperature, whereby the pH-value is kept at 7 by addition of a 15% solution of sodium carbonate. After the end of the reaction 1.3% by weight on volume of sodium chloride is added slowly at ambient temperature, the mixture stirred for 1.5 hours and the precipitated product filtered off. 132.5 parts of the (humid) intermediate dyestuff with the structure

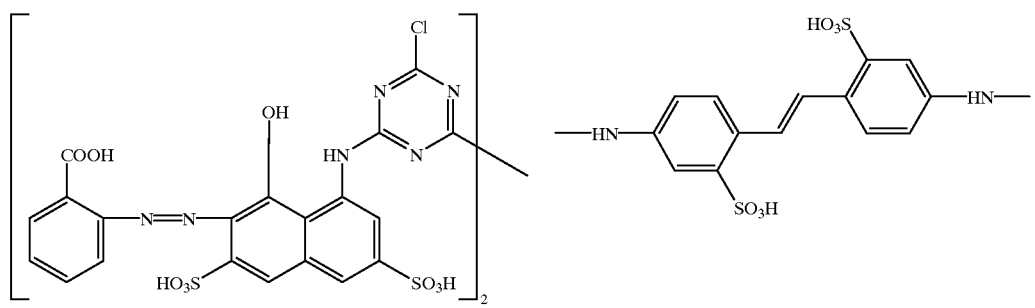

are obtained. This product is mixed with 865 parts of water in a reaction vessel of 1.5 liters equipped with stirrer, pH-electrode, thermometer and reflux cooler. 6.8 parts monoethanolamine are added and the mixture heated to 95° C. The pH-value first raises to about 11 and drops during the reaction. It is kept at 8.5 by addition of a 30% solution of sodium hydroxide. After the end of the reaction the mixture is cooled to 80° C., adjusted to pH=6 with drops of a 30% solution of hydrochloric acid and 8.5% by weight on volume of sodium chloride added in portions. The precipitated dyestuff is filtered and dried in vacuum at 80° C. 63 parts of the dyestuff with structure

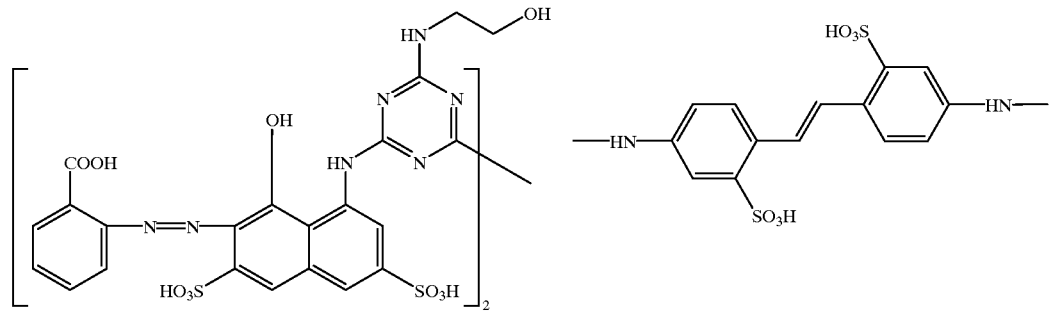

are obtained in the form of the sodium salt. It dyes sized and unsized paper in bluish red hues (magenta, $\lambda$max=546 nm). Due to its high affinity for the substrate the back water is almost colorless and the dyeings have remarkably high fastness to water, alcohol, milk and acetic acid.

The dyestuff also has high affinity to cotton (expressed as exhaustion value when dyeing as a direct dyestuff) and the bluish red dyeings have good wet and light fastnesses.

Further dyestuffs (Examples 118 to 139) of the general formula (I) may be produced analogously to the procedure given in Example 117 (see Table 8). In all Examples D=o-carboxyphenyl, $R_1=R_2=H$ and the two sulphogroups at the aminonaphthol radical are in the positions 3 and 6.

TABLE 8

| Ex. | X | Y | $\lambda$max * (nm) |
|---|---|---|---|
| 118 | —N(morpholine) | HO₃S-stilbene-SO₃H with HN groups | 521 |
| 119 | —N(—C₂H₄—OH)₂ | HO₃S-stilbene-SO₃H with HN groups | 546 |
| 120 | —N(piperazine)—CH₂CH₂—OH | HO₃S-stilbene-SO₃H with HN groups | 520 |

TABLE 8-continued

| Ex. | X | Y | λmax * (nm) |
|---|---|---|---|
| 121 | —NH—C₆H₅ | stilbene with 4,4'-bis(HN—), 2,2'-bis(SO₃H) | 521 |
| 122 | —NH—C₆H₄—O—CH₃ | stilbene with 4,4'-bis(HN—), 2,2'-bis(SO₃H) | 521 |
| 123 | —NH—CH₂—C₆H₅ | stilbene with 4,4'-bis(HN—), 2,2'-bis(SO₃H) | 546 |
| 124 | —NH—C₂H₄—C₆H₅ | stilbene with 4,4'-bis(HN—), 2,2'-bis(SO₃H) | 546 |
| 125 | —NH—C₂H₄—OH | 1,4-phenylenediamine (—NH—C₆H₄—NH—) | 529 |
| 126 | —N-morpholino | 1,4-phenylenediamine (—NH—C₆H₄—NH—) | 517 |

TABLE 8-continued
| Ex. | X | Y | λmax * (nm) |
|---|---|---|---|
| 127 | —N(—C$_2$H$_4$—OH)$_2$ | 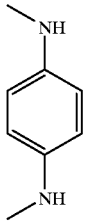 | 517 |
| 128 | 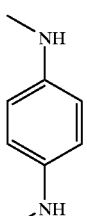 | 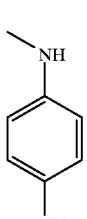 | 516 |
| 129 | 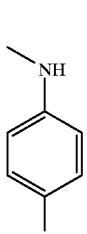 | 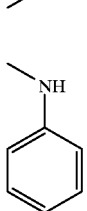 | 571 |
| 130 | 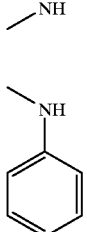 | | 520 |
| 131 | | | 532 |
| 132 | | | 530 |

TABLE 8-continued
| Ex. | X | Y | λmax * (nm) |
|---|---|---|---|
| 133 | 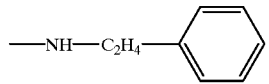 | 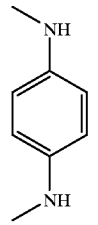 | 522 |
| 134 | —NH—C₂H₄—OH | 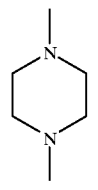 | 545 |
| 135 | 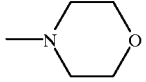 | 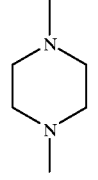 | 545 |
| 136 | —N(—C₂H₄—OH)₂ | 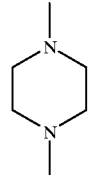 | 545 |
| 137 | —N(CH₃)—C₂H₄—OH | 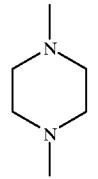 | 518 |
| 138 | 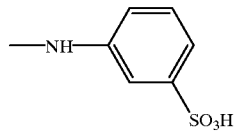 | 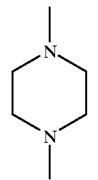 | 545 |
| 139 | 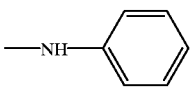 | 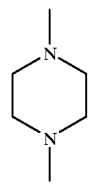 | 541 |
*solvent: Water/ammonium acetate

Example 140

Analogously to example 2 from
26.6 parts 2,4,6-trichloro-1,3,5-triazine;
44.7 parts 1-amino-8-hydroxynaphthalene-3,6-di-sulfonic acid;
20.0 parts anthranilic acid amide;
25.9 parts 4,4'-diaminostilbene-2,2'-disulfonic acid; and
20.8 parts diethanolamine,
178 parts of the dyestuff of the following structure is obtained in the form of the sodium salt:

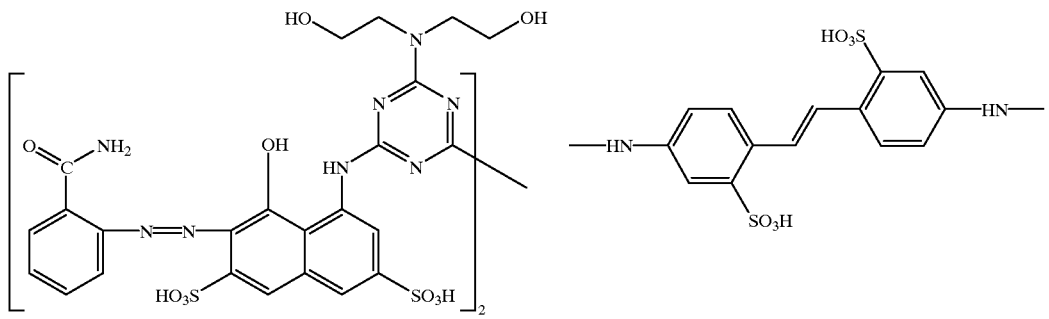

It dyes sized and unsized paper in bluish red hues (magenta, λmax=528 nm). Due to its high affinity for the substrate the backwater is almost colorless and the dyeings have remarkably high fastness to water, alcohol, milk and acetic acid.

The dyestuff also has high affinity to cotton (expressed as exhaustion value when dyeing as a direct dyestuff) and the bluish red dyeings have good wet and light fastnesses.

Examples 141–145

Further dyestuffs of the general formula (I) may be produced analogously to the procedure given in Example 140 (see Table 9).

TABLE 9

| Ex. | X | λmax * (nm) |
|---|---|---|
| 141 | —NH—C$_2$H$_4$—OH | 546 |

TABLE 9-continued

| Ex. | X | λmax * (nm) |
|---|---|---|
| 142 | —NH—C$_6$H$_5$ (phenyl) | 548 |
| 143 | —NH—CH$_2$—C$_6$H$_5$ | 546 |
| 144 | —NH—C$_2$H$_4$—C$_6$H$_5$ | 547 |
| 145 | morpholino | 526 |

*solvent: Water/ammonium acetate

Example 146

In a beaker glass of 5 liters equipped with stirrer, pH-electrode and thermometer a mixture of 240 parts water, 240 parts ice and 30.4 parts of 2,4,6-trichloro-1,3,5-triazine with 5 drops of a wetting agent (e.g. Sandozin NIL) is stirred for about 30 minutes at 0–5° C. to obtain a fine suspension. A solution of 144.4 parts (Titer=57.3%) of 1-amino-8-hydroxy-7-(2'-sulfonaphthyl azo)naphthalene-3,6-disulfonic acid in 3125 parts of water are added dropwise at 10° C. in the course of 1 hour and the pH-value is kept at 5 by addition of a 15% solution of sodium carbonate. The pH-value is then raised to 6–6.63 and the mixture stirred for about 2 hours at 8–10° C. until the reaction is finished. A solution of 27.8 parts of 4,4'-diaminostilbene-2,2'-disulfonic acid in 300 parts of water which is adjusted to pH=7 by addition of a 30% solution of sodium hydroxide is then added. The reaction mixture is warmed up to 40° C. and stirred for about 2 hours at this temperature, whereby the pH-value is kept at 7 by addition of a 15% solution of sodium carbonate. After the end of the reaction 12.8% by weight on volume of sodium chloride is added slowly at ambient temperature, the mixture stirred for 1.5 hours and the precipitated product filtered off. 559.6 parts of the (humid) intermediate dyestuff with the structure are obtained. 93 parts of this product are mixed with 400 parts of water in a reaction vessel of 3 liters equipped with stirrer, pH-electrode, thermometer and reflux cooler. 3.7 parts of diethanolamine are added and the mixture heated to 95° C. The pH-value first raises to about 10.5 and drops during the reaction. It is kept at 8.5 by addition of a 30% solution of sodium hydroxide. After the end of the reaction the mixture is cooled to 80° C., adjusted to pH=6 with drops (ca. 1.4 parts) of a 30% solution of hydrochloric acid and diluted with 500 parts of water. After cooling to room temperature 1200 parts of ethanol are added while stirring and after about 1.5 hours the precipitated product is filtered and dried at 80° C. under vacuum. 23.3 parts of the dyestuff with structure are obtained in the form of the sodium salt. It dyes sized and unsized paper in bluish red hues (magenta, λmax=528 nm). Due to its high affinity for the substrate the backwater is almost colorless and the dyeings have remarkably high fastness to water, alcohol, milk and acetic acid.

The dyestuff also has high affinity to cotton (expressed as exhaustion value when dyeing as a direct dyestuff) and the bluish red dyeings have good wet and light fastnesses.

Further dyestuffs (Examples 147 to 162) of the general formula (I) may be produced analogously to the procedure given in Example 146 (see Table 10). In all Examples $R_1=R_2=H$ and the two sulphogroups at the aminonaphthol radical are in the positions 3 and 6.

TABLE 10

| Ex. | X | Y | λmax * (nm) |
|---|---|---|---|
| 147 | —NH—$C_2H_4$—OH | | 550 |

TABLE 10-continued
| Ex. | X | Y | λmax * (nm) |
|---|---|---|---|
| 148 | 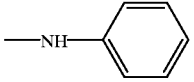 | 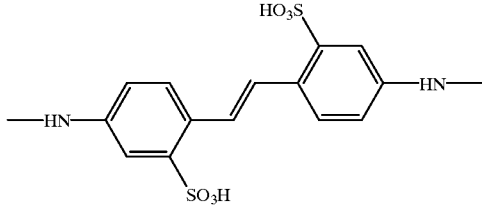 | 551 |
| 149 | 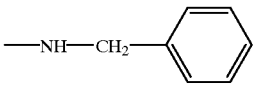 | 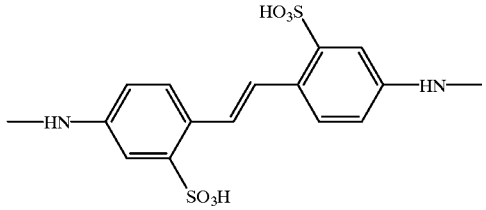 | 550 |
| 150 | 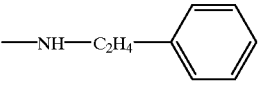 | 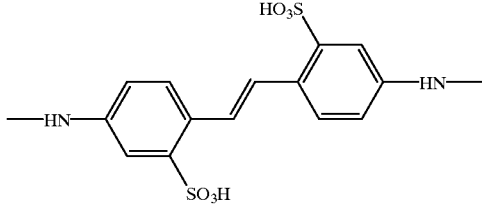 | 550 |
| 151 | —NH—C$_2$H$_4$—OH | 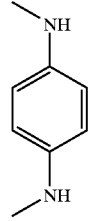 | 526 |
| 152 | 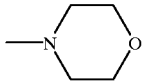 | 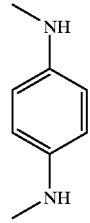 | 527 |
| 153 | —N(C—C$_2$H$_4$—OH)$_2$ | 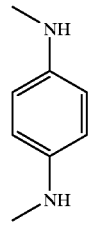 | 527 |

TABLE 10-continued
| Ex. | X | Y | λmax * (nm) |
|---|---|---|---|
| 154 | 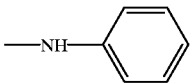 | 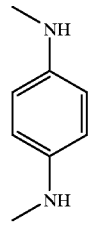 | 528 |
| 155 | 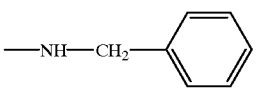 | 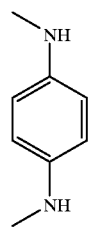 | 529 |
| 156 | 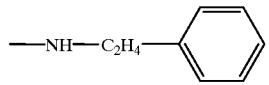 | 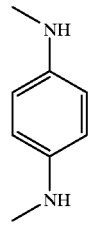 | 528 |
| 157 | —NH—C₂H₄—OH | 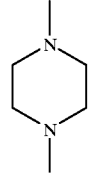 | 526 |
| 158 | 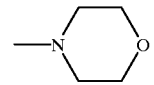 | 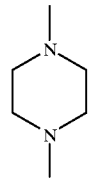 | 523 |
| 159 | —N(—C₂H₄—OH)₂ | 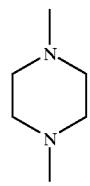 | 524 |
| 160 | 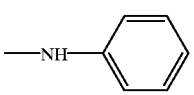 | 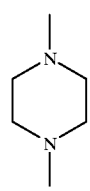 | 527 |

TABLE 10-continued

| Ex. | X | Y | λmax * (nm) |
|---|---|---|---|
| 161 | —NH—CH₂—C₆H₅ | N-methylpiperazinyl (N-Me, N-Me) | 522 |
| 162 | —NH—C₂H₄—C₆H₅ | N-methylpiperazinyl (N-Me, N-Me) | 521 |

*solvent: water/ammonium acetate.

Example 163 (Copper Complex)

In a beaker glass of 2 liters, equipped with stirrer, thermometer, pH-electrode and dropping funnel, 13,8 parts of dyestuff of example 117 are dissolved in 1200 parts of water at room temperature. 46 parts of a solution of 5 parts of copper-sulphate penta-hydrate in 50 parts of water are added dropwise at room temperature in the course of 1 h, while the pH value is kept at pH=5,5 by the addition of a 15% solution of sodium carbonate. 16,4 parts of sodium chloride are added and after stirring 30 min the precipitated product is filtered and dried in vacuum at 70° C. 12.1 parts dyestuff (example 163 in Table 11) are obtained. It dyes cotton and paper in reddish violet shades.

Using an alaogous method also the dyestuffs of Examples 164–166 in Table 11 can be produced.

TABLE 11

| Ex. | X | λmax * (nm) |
|---|---|---|
| 163 | —NH—C₂H₄—OH | 553 |
| 164 | N-(2-hydroxyethyl)-N'-methylpiperazine | 551 |
| 165 | —NH—C₆H₅ | 552 |
| 166 | —NH—CH₂—C₆H₅ | 551 |

*solvent: water/ammonium acetate

Example 167

12.6 parts dyestuff solution of example 3 are added dropwise at room temperature to a stirred mixture of 20.0 parts diethylene glycol and 67.4 parts of demineralized water. The resulting ink exhibits good light- and waterfastness properties.

APPLICATION EXAMPLE A 70 parts of chemically bleached sulphite cellulose of pinewood and 30 parts of chemically bleached sulphite cellulose of birchwood are ground in a Holländer in 2000 parts of water. 0.2 parts of the dyestuff of example 1 are sprinkled into this pulp. After mixing for 20 minutes, paper is produced therefrom. The absorbent paper obtained in this way is dyed reddish-yellow. The waste water is practically colourless.

APPLICATION EXAMPLE B 0.5 parts of the dyestuff powder of example 1 are dissolved in 100 parts of hot water and cooled to room temperature. The solution is added to 100 parts of chemically bleached sulphite cellulose, which have been ground in a Holländer with 2000 parts of water. After thorough mixing for 15 minutes, sizing takes place in the usual way with rosin size and aluminium sulphate. Paper which is produced from this material has a reddish-yellow shade, and has good waste-water and wet fastness, as well as good light fastness.

APPLICATION EXAMPLE C

An absorbent length of unsized paper is drawn through a dyestuff solution of the following composition at 40–50:
0.5 parts of the dyestuff of example 1
0.5 parts of starch and
99.0 parts of water.

The excess dyestuff solution is squeezed out through two rollers. The dried length of paper is dyed reddish-yellow.

Dyeing may also take place in a similar manner to that of examples A to C using the dyestuffs of examples 4 to 166 or resp. a dye preparation thereof. The paper dyeings obtained are red and have a high level of fastness.

APPLICATION EXAMPLE D 50 parts of bleached pinewood sulphite cellulose and 50 parts of bleached beech cellulose (degree of beating 30 SR*) are mixed with 0.5 parts of the dyestuff of example 1 in water (pH 4, water hardness 10 dH). After 16 minutes, sheet formation takes place. The paper is dyed in an intense reddish-yellow shade. In contrast, a dyeing made at pH 7 shows no variation in depth or shade. The rate of exhaustion reaches 100% and the waste water is colourless.
*) SR=Schopper Riegler degree

APPLICATION EXAMPLE E 100 parts of intermediate-dried chrome velours leather are drummed for one hour at 50 in a drum containing a bath of 400 parts of water, 2 parts of 25% ammonium hydroxide solution and 0.1 parts of a commercial wetting agent. The bath is subsequently drained. 400 parts of water of 60 and 1 part of 25% ammonium hydroxide solution are added to the drummed chrome velours leather which is still moist. After adding 5 parts of the dyestuff of example 1, dissolved in 200 parts of water, dyeing is effected for 90 minutes at 60. Then, 50 parts of 8% formic acid are slowly added in order to acidify the pH. The treatment is then continued for a further 30 minutes. Finally, the leather is rinsed, dried and finished in the usual way. The red leather dyeing obtained is level.

APPLICATION EXAMPLE F 1.1 parts of the dyestuff of example 1 are dissolved at 60 in 100 parts of demineralized water and subsequently diluted with 900 parts of cold, demineralized water. Then, 100 parts of cotton tricot (bleached) are added to the dye bath. After 5 minutes, 10 parts of calcined sodium sulphate and 2 parts of ammonium sulphate are added. During 70 minutes, the temperature of the dye bath is continuously raised to 98. This temperature is maintained for 20 minutes and the dye bath is then cooled to 70 over the course of 30 minutes. The dyed material is rinsed for 2 minutes firstly with cold, demineralized water, and subsequently for 2 minutes with cold tap water, then centrifuged and dried. The cotton dyeing obtained is red.

APPLICATION EXAMPLE G 100 parts of cotton tricot, which have been dyed with the dyestuff of example 1 analogously to the method of example F in ca. 1/1 standard depth, are mixed without intermediate drying in 1000 parts of tap water at 25 with 5 parts of sodium chloride and 4 parts of an after-treatment agent obtained from the reaction of diethylenetriamine with dicyandiamide. The pH value of the dye bath is set at 6.5–7. The bath is heated to 60 over the course of 20 minutes, and this temperature is maintained for a further 20 minutes. Afterwards, the material is rinsed with cold tap water. The red cotton dyeing which has been after-treated in this way has perfect washing fastness and very good light fastness.

APPLICATION EXAMPLE H

A cotton dyeing produced with the dyestuff of example 1 analogously to the method of example F in 1/1 standard depth, is impregnated on a padder with a solution, which contains 100 g/l of an after-treatment agent obtained by reacting the after-treatment agent of example G with dimethyloldihydroxyethyleneurea and a hardening catalyst, and it is squeezed out to a pick-up of ca. 80%. It is subsequently shock-dried for 45 seconds on a stenter at a temperature of 175–180. The yellow cotton dyeing thus obtained is notable for its perfect washing fastness. At the same time, there is a considerable improvement in the creasing fastness, and reduced swelling value of the cellulosic fibres.

APPLICATION EXAMPLE I 0.6 parts of the of formula:

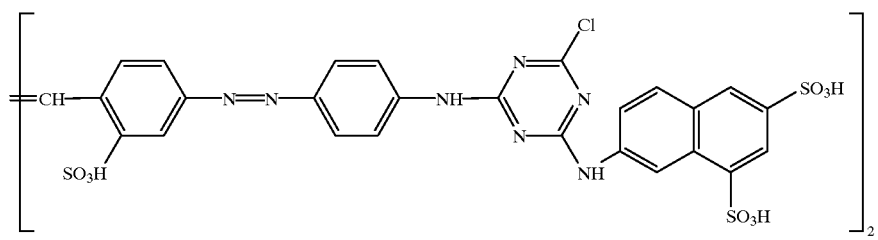

1.14 parts of the dyestuff according to example 1 and
1.06 parts of the dyestuff of Colour Index no. Direct Blue 90 having a pure dyestuff content of 47.6%
are each dissolved in 100 parts of demineralized water at 60° C.

The three solutions are added to 700 parts of cold demineralized water. Then, 100 parts of cotton tricot (bleached) are added to the dye bath. After 5 minutes, 10 parts of calcined sodium sulphate and 2 parts of ammonium sulphate are added. During 70 minutes, the temperature of the dye bath is continuously raised to 98. This temperature is maintained for 20 minutes, and then the dye bath is cooled over the course of 30 minutes to 70. The dyed material is rinsed for 2 minutes firstly with cold, demineralized water, and subsequently for 2 minutes with cold tap water, then centrifuged and dried. The cotton dyeing obtained is deep black.

APPLICATION EXAMPLE J 100 parts of cotton tricot, which have been dyed in a deep black shade analogously to the method of example I, are mixed without intermediate drying in 1000 parts of tap water at 25 with 5 parts of sodium chloride and 4 parts of the after-treatment agent of example G. The pH value of the dye bath is set at 6.5–7. The bath is heated over the course of 20 minutes to 60 and this temperature is maintained for a further 20 minutes. Afterwards, the material is rinsed with cold tap water. The cotton dyeing thus after-treated has very good washing and light fastness.

APPLICATION EXAMPLE K

A printing paste having the components
40 parts of the dyestuff of example 1
100 parts of urea
330 parts of water
500 parts of a 4% sodium alginate thickener
10 parts of the sodium salt of 1-nitrobenzene-3-sulphonic acid
20 parts of soda
1000 parts in all
is applied to cotton material by conventional printing processes.

The printed and dried material is steamed for 4–8 minutes at 102–105 C. and then given a cold and a hot rinse. The fixed cotton material is subsequently washed at the boil.

APPLICATION EXAMPLE L 12.6 parts dyestuff solution of example 3 are added dropwise at room temperature to a stirred mixture of 20.0 parts diethyleneglycole and 67.4 parts of demineralized water. The resulting ink exhibits good light- and waterfastness properties.

What is claimed is:

1. A compound of formula (I)

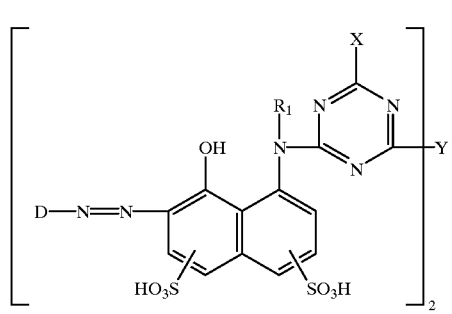

(I)

wherein

D is a radical of a diazo component selected from the group having the formulae (a), (b), (c)

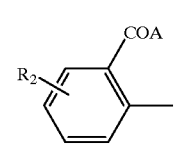

(a)

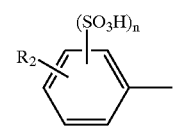

(b)

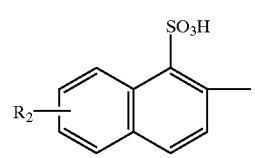

(c)

A is OH or $NH_2$;
$R_1$ is independently H, $C_{1-4}$alkyl;
$R_2$ is hydrogen, $C_{1-4}$alkyl, $C_{1-4}$alkoxy, halogen;
X is amino, mono- or di-$C_{1-3}$alkylamino, mono- or di(hydroxy-$C_{2-4}$alkyl)amino, monocarboxy-$C_{1-4}$alkylamino, monosulpho-$C_{1-4}$alkylamino, or morpholino,
Y is the radical of 4,4'-diamino-stilbene-2,2'-disulfonic acid;
m is 0, 1 or 2; and
n is 1 or 2;
or a salt thereof or a mixture of such compounds.

2. A compound according to claim 1 having the formula (Ia)

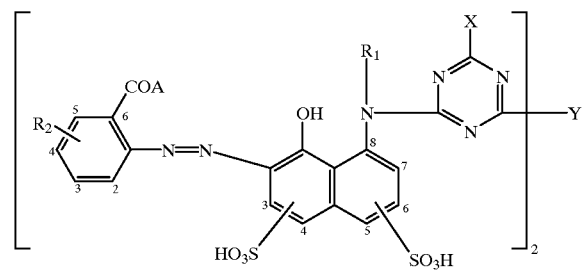

(Ia)

wherein $R_1$, $R_2$, X, Y and A have the meaning given in claim 1.

3. A compound according to claim 1 having the formula (Ib)

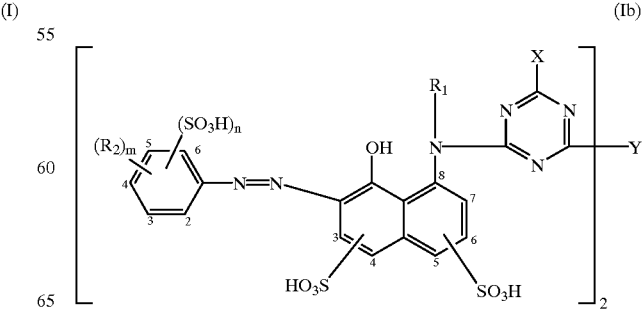

(Ib)

wherein $R_1$, $R_2$, m, n, X and Y have the meaning given in claim 1.

4. A compound according to claim 1 having the formula (Ic)

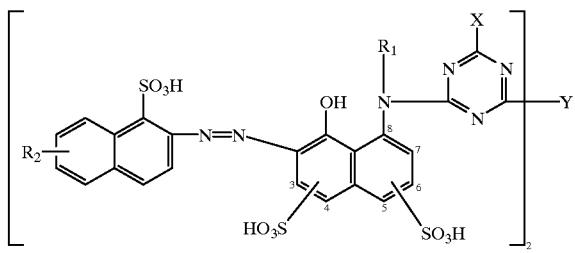

wherein $R_1$, $R_2$, X and Y have the meaning given in claim 1.

5. A process for the preparation of a compound of formula (I) according to claim 1, comprising reacting a compound of formula (IIa) having the following formula:

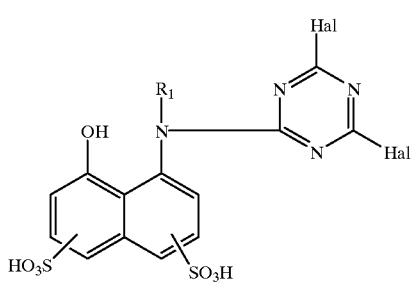

with a diazotised compound of formula (IIb), having the following formula:

so as to give a compound of formula (III), having the following formula:

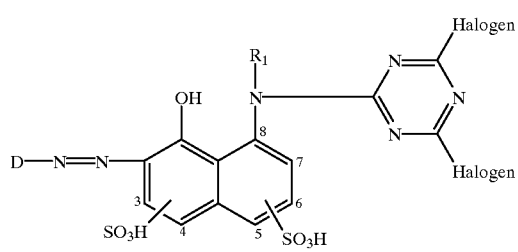

in which D and $R_1$ have the meaning given in claim 1, which compound is reacted with an appropriate diamino compound to give a compound of formula (I) in which X is halogen, after which such compound is further reacted with an appropriate amino compound to give a compound of formula (I) in which X is an amino group.

6. A process for the preparation of a compound of formula (I) according to claim 1, in which D is of formula (a) with A=OH and/or formula (c), comprising reacting the dyestuff of formula (IV)

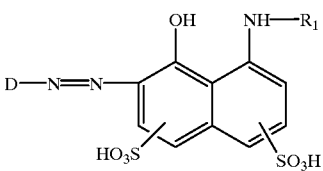

in which D and $R_1$ are as defined in claim 1, with cyanuric halogenide so as to give a compound of formula (III), having the following formula:

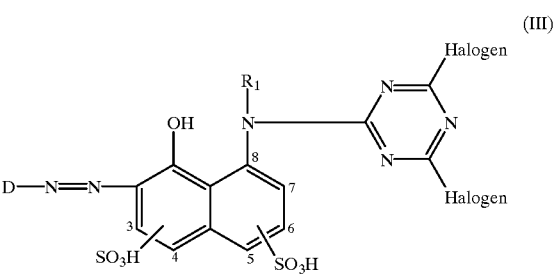

in which D and $R_1$ are as defined in claim 1, which compound is reacted with an appropriate diamino compound to give a compound of formula (I) in which X is halogen, after which such compound is further reacted with an appropriate amino compound to give a compound of formula (I) in which X is an amino group.

7. A process according to claim 5, for the preparation of a compound of formula (Ia)

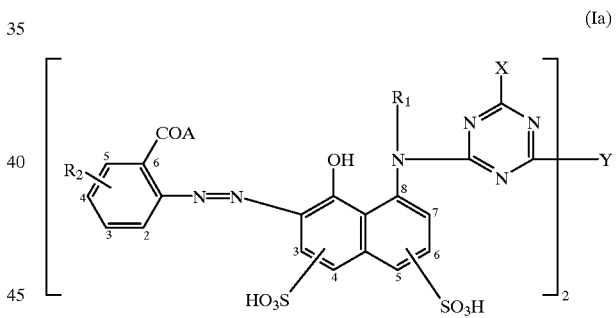

in which A is OH in complex form, comprising the conversion of a metal-free compound of formula (Ia) into a 1:1 copper complex.

8. Process for dyeing or printing organic substrates containing hydroxy groups, thiol groups or nitrogen atoms, comprising the application of a compound of formula (I) according to claim 1 to such substrates.

9. Process according to claim 8 for dyeing or printing cellulosic textile materials or paper.

10. Organic substrates dyed or printed by the process of claim 8.

11. Process for the preparation of ink-jet inks, characterized in that a compound of formula (I) according to claim 1 is used.

12. Ink-jet inks prepared by the process of claim 11.

13. A process for dyeing or printing organic substrate according to claim 8 wherein said compound of formula (1) is selected from the group consisting of: paper dyes, direct dyes and ink jet inks.

* * * * *